(12) United States Patent
Hapsari et al.

(10) Patent No.: US 8,433,313 B2
(45) Date of Patent: Apr. 30, 2013

(54) MOBILE COMMUNICATION METHOD AND MOBILE COMMUNICATION SYSTEM

(75) Inventors: Wuri Andarmawanti Hapsari, Yokosuka (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 180 days.

(21) Appl. No.: 12/866,268

(22) PCT Filed: Feb. 3, 2009

(86) PCT No.: PCT/JP2009/051757
§ 371 (c)(1),
(2), (4) Date: Oct. 12, 2010

(87) PCT Pub. No.: WO2009/099048
PCT Pub. Date: Aug. 13, 2009

(65) Prior Publication Data
US 2011/0021185 A1    Jan. 27, 2011

(30) Foreign Application Priority Data

Feb. 6, 2008   (JP) .................................. 2008-027021

(51) Int. Cl.
*H04W 4/00* (2009.01)
(52) U.S. Cl.
USPC ....................................... 455/422.1; 455/436

(58) Field of Classification Search ............... 455/422.1, 455/436, 442, 518
See application file for complete search history.

(56) References Cited

FOREIGN PATENT DOCUMENTS
WO      2006/129603 A1    12/2006

OTHER PUBLICATIONS

NTT DoCoMo, "Discussion on SCTP issues and Text Proposal for TS 36.412/36.422," 3GPP TSG-RAN3 #58, R3-072080, Nov. 2007, 5 pages.
International Search Report issued in PCT/JP2009/051757, mailed on Mar. 17, 2009, w/translation, 3 pages.
Written Opinion issued in PCT/JP2009/051757, mailed on Mar. 17, 2009, 3 pages.
Office Action and Written Opinion for Singaporean Application No. 201005630-7 dated Feb. 29, 2012 (6 pages).

*Primary Examiner* — Sam Bhattacharya
(74) *Attorney, Agent, or Firm* — Osha Liang LLP

(57) ABSTRACT

A mobile communication method according to the present invention includes the steps of: transmitting, from a higher-level node to a macro radio base station, an "INIT(SCTP)", when the higher-level node detects that no SCTP connection is established with the macro radio base station; and transmitting, from a home radio base station to a higher-level node, an "INIT(SCTP)", when the home radio base station detects that no SCTP connection is established with the higher-level node. The higher-level node does not transmit "INIT(SCTP)" to the home radio base station, even when detecting that no SCTP connection is established with the home radio base station.

4 Claims, 6 Drawing Sheets

MOBILE COMMUNICATION METHOD AND MOBILE COMMUNICATION SYSTEM

TECHNICAL FIELD

The present invention relates to a mobile communication method and a mobile communication system for establishing a control signal connection between a higher-level node and a radio base station.

BACKGROUND ART

The 3GPP has been making a study on specification of a home base station (second radio base station) Home Node B used in a mobile communication system employing the UTRAN (Universal Terrestrial Radio Access Network) system.

FIG. 5 shows a configuration of the UTRAN mobile communication system. As shown in FIG. 5, the UTRAN mobile communication system includes a core network apparatus CN, a radio controller RNC, a macro radio base station (first radio base station) Node B and a home radio base station (second radio base station) Home Node B.

Here, the macro radio base station Node B is a normal radio base station installed by a communication carrier or the like, whereas the home radio base station Home Node B is a small radio base station installed inside a house or the like by a general user, a communication carrier or the like (also called a femto radio base station).

Note that the UTRAN mobile communication system is configured so that a user signal is transmitted and received via a U-plane interface between the macro radio base station Node B or the home radio base station Home Node B and the radio controller RNC, and via a U-plane interface between the radio controller RNC and the core network apparatus CN.

On the other hand, a control signal is configured to be transmitted and received via a C-plane interface between the macro radio base station Node B or the home radio base station Home Node B and the radio controller RNC, and a C-plane interface between the radio controller RNC and the core network apparatus CN in the UTRAN mobile communication system.

In addition, FIGS. 6 and 7 respectively show two types of configurations of the UTRAN mobile communication systems employing the HSPA (High Speed Packet Access).

As shown in FIG. 6, such a UTRAN mobile communication system of the first type includes a core network apparatus CN, a radio controller RNC, a macro radio base station (first radio base station) Node B and a Home Node B (second radio base station).

In addition, as shown in FIG. 7, such a UTRAN mobile communication system of the second type includes a core network apparatus CN, a macro radio base station (first radio base station) Node B and a home radio base station (second radio base station) Home Node B.

Specifically, the aforementioned UTRAN mobile communication system of the first type is configured to cause a part (U-plane function) of the functions of the radio controller RNC to transition to the macro radio base station Node B and the home radio base station Home Node B.

Moreover, the aforementioned UTRAN mobile communication system of the second type is configured to cause all of the functions of the radio controller RNC to transition to the macro radio base station Node B and the home radio base station Home Node B.

Note that, in the aforementioned UTRAN mobile communication system of the first type, a user signal is configured to be transmitted and received via a U-plane interface between the macro radio base station Node B or the home radio base station Home Node B and the core network apparatus CN, whereas a control signal is configured to be transmitted and received via a C-plane interface between the macro radio base station Node B or the home radio base station Home Node B and the radio controller RNC, and a C-plane interface between the radio controller RNC and the core network apparatus CN.

Moreover, in the aforementioned UTRAN mobile communication system of the second type, a user signal is configured to be transmitted and received via a U-plane interface between the macro radio base station Node B or the home radio base station Home Node B and the core network apparatus CN, whereas a control signal is configured to be transmitted and received via a C-plane interface between the macro radio base station Node B or the home radio base station Home Node B and the core network apparatus CN.

FIG. 8 shows a protocol stack according to the C-plane interface between the radio base station Home Node B/Node B and the higher-level node (radio controller RNC or core network apparatus CN).

As shown in FIG. 8, a TNL (Transport Network Layer) and an RNL (Radio Network Layer) are defined as the protocols used in the aforementioned C-plane interface.

Here, in the UTRAN mobile communication system, an SCTP (Stream Control Transmission Protocol) connection (control signal connection) is configured to be established by a request from a higher-level node (radio controller RNC, for example).

As shown in FIG. 9, the higher-level node is configured to transmit an SCTP "INIT (control signal connection establishment request)" to the home radio base station Home Node B or the macro radio base station Node B, when detecting that no SCTP connection (control signal connection) is established with the home radio base station Home Node B or the macro radio base station Node B.

The home radio base station Home Node B, however, is a small radio base station installed inside a house or the like. A general user can install a home radio base station Home Node B by himself or herself. In addition, the user can freely turn on or off the power of the home radio base station Home Node B.

Accordingly, there arises a problem in a case where the home radio base station Home Node B is installed by a general user and where the power of the home radio base station Home Node B is turned off by the user. In this case, the higher-level node has to repeatedly transmit the SCTP "INIT (control signal connection establishment request)" although such transmission is useless, thereby causing an increase in the processing load.

DISCLOSURE OF THE INVENTION

In this respect, the present invention has been made in view of the aforementioned problem. An object of the present invention is to provide a mobile communication method and a mobile communication system capable of efficiently establishing an SCTP connection while avoiding an unnecessary increase in the processing load of a higher-level node by switching SCTP connection establishment methods between a home radio base station Home Node B and a macro radio base station Node B.

A first aspect of the present invention is summarized as a mobile communication method for establishing a control signal connection between a higher-level node and a radio base station, the method including the steps of: transmitting, from the higher-level node to a first radio base station, a first control signal connection establishment request, when the higher-level node detects that no control signal connection is established with the first radio base station; establishing, a first control signal connection between the higher-level node and the first radio base station in response to the transmitted first control signal connection establishment request; transmitting, from a second radio base station to a higher-level node, a second control signal connection establishment request, when the second radio base station detects that no control signal connection is established with the higher-level node; and establishing a second control signal connection between the higher-level node and the second radio base station in response to the transmitted second control signal connection establishment request; wherein the higher-level node does not transmit the second control signal connection establishment request to the second radio base station, even when detecting that no control signal connection is established with the second radio base station.

In the first aspect of the present invention, the mobile communication method can further include the steps of: transmitting, from the higher-level node to the first radio base station, a first monitoring signal for monitoring the first radio base station, via the first control signal connection; and transmitting, from the higher-level node to the second radio base station, a second monitoring signal for monitoring the second radio base station, via the second control signal connection; wherein the number of transmissions of the first monitoring signal can be greater than the number of transmissions of the second monitoring signal in a predetermined period.

A second aspect of the present invention is summarized as a mobile communication system configured to establish a control signal connection between a higher-level node and a radio base station, wherein the higher-level node is configured to transmits a first control signal connection establishment request to a first radio base station, when detecting that no control signal connection is established with the first radio base station; a first control signal connection is configured to be established between the higher-level node and the first radio base station in response to the transmitted first control signal connection establishment request; a second radio base station is configured to transmit a second control signal connection establishment request to the higher-level node, when detecting that no control signal connection is established with the higher-level node; a second control signal connection is configured to be established between the higher-level node and the second radio base station in response to the transmitted second control signal connection establishment request; and the higher-level node does is configured not to transmit the second control signal connection establishment request to the second radio base station, even when detecting that no control signal connection is established with the second radio base station.

In the second aspect of the present invention, the higher-level node can be configured to transmit a first monitoring signal for monitoring the first radio base station to the first radio base station via the first control signal connection; the higher-level node can be configured to transmit a second monitoring signal for monitoring the second radio base station to the second radio base station via the second control signal connection; and the number of transmissions of the first monitoring signal can be configured to be greater than the number of transmissions of the second monitoring signal in a predetermined period.

BEST MODE FOR CARRYING OUT THE INVENTION

Configuration of Mobile Communication System According to First Embodiment of the Present Invention A configuration of a mobile communication system according to a first embodiment of the present invention will be described with reference to FIGS. 1 through 3.

Figure 5:
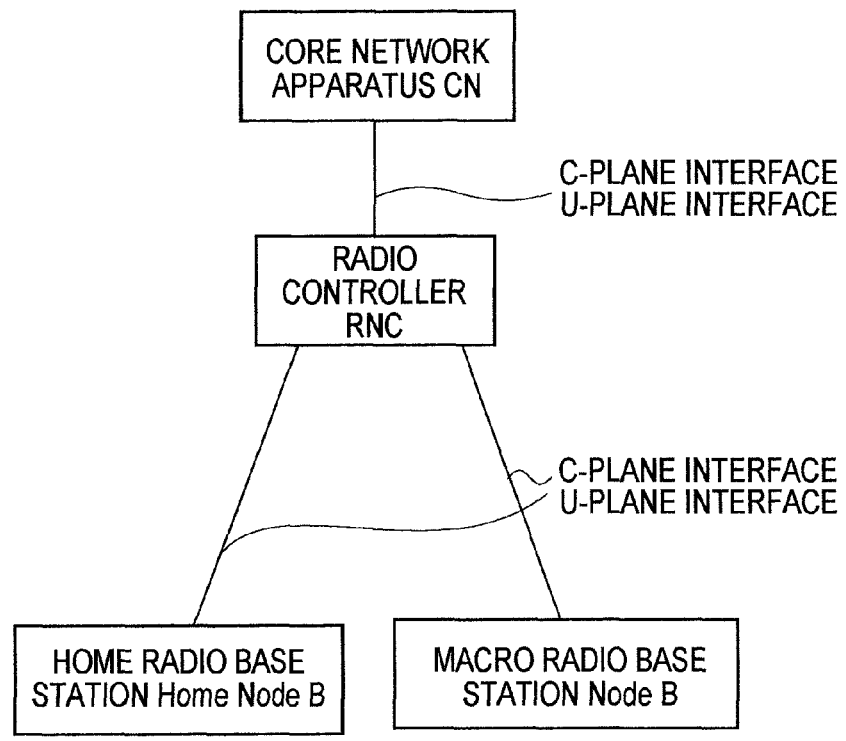
FIG. 5 is an overall configuration diagram of a mobile communication system defined in 3GPP.
Figure 6:
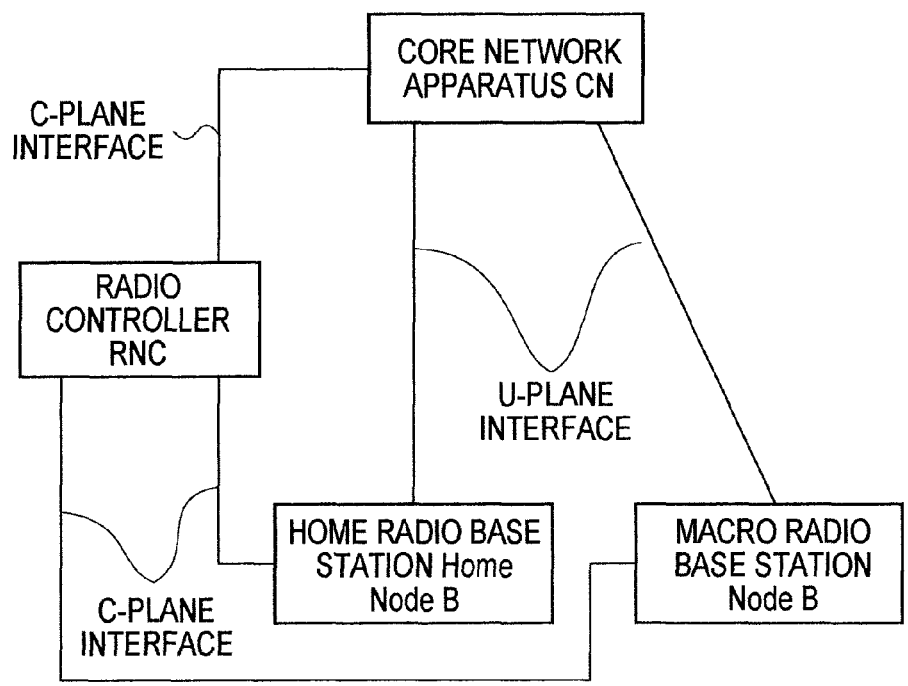
FIG. 6 is an overall configuration diagram of a mobile communication system defined in 3GPP.
Figure 7:
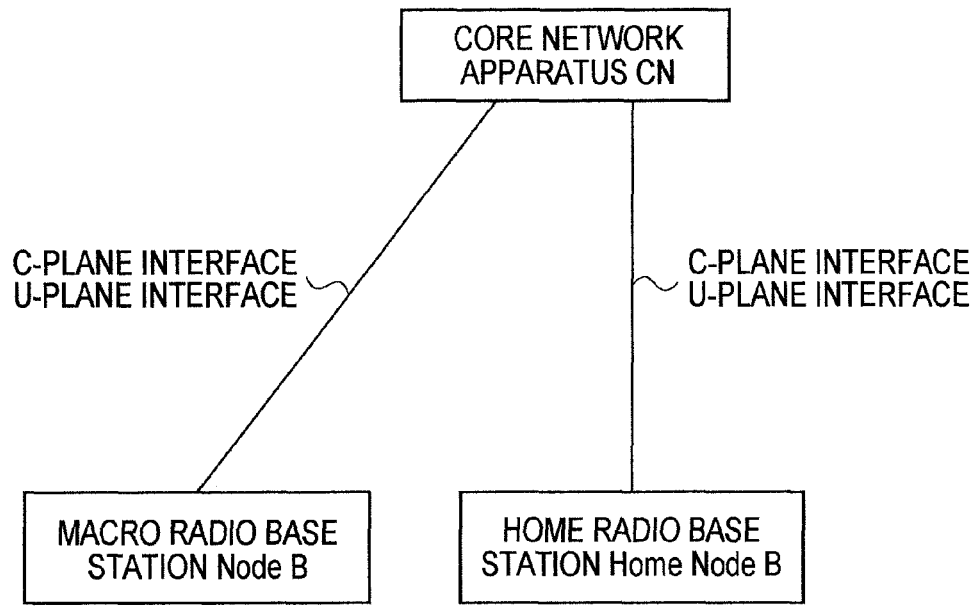
FIG. 7 is an overall configuration diagram of a mobile communication system defined in 3GPP.
Figure 8:
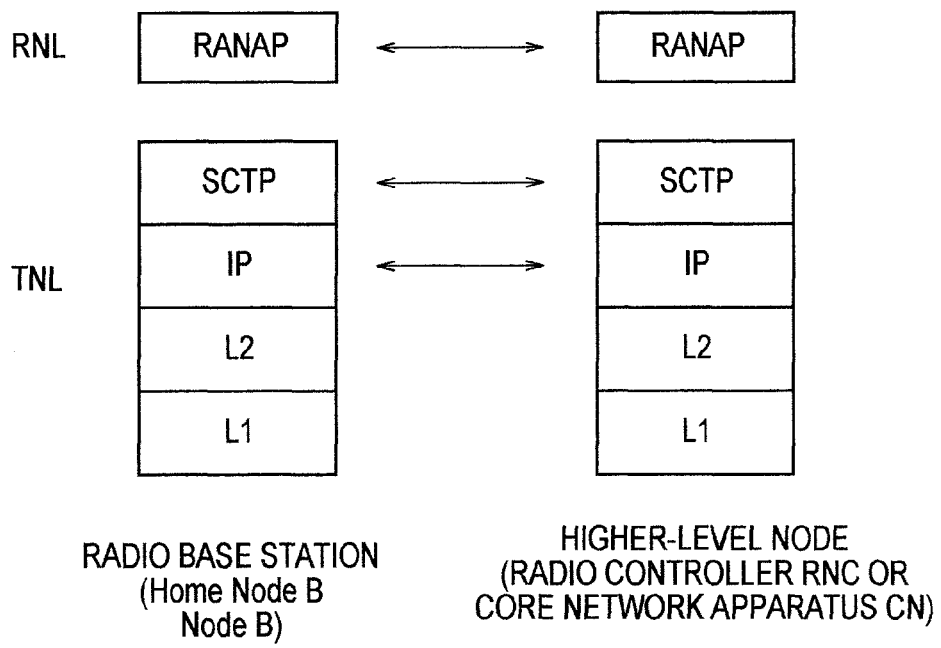
FIG. 8 is a diagram showing a protocol stack between a radio base station and a higher-level node in a mobile communication system defined in 3GPP.
Figure 9:
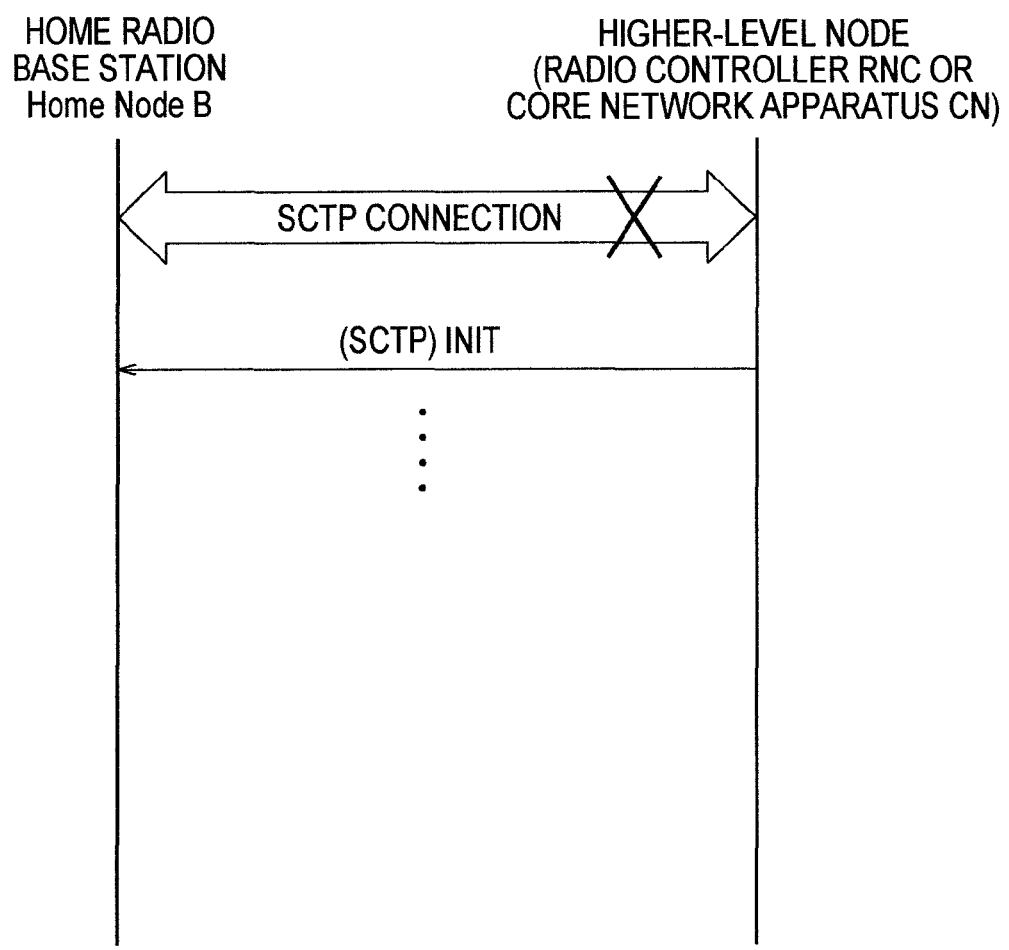
FIG. 9 is a diagram describing a problem in a conventional mobile communication system.

Note that, the mobile communication system according to the first embodiment of the present invention includes a configuration shown in FIG. 5 or FIG. 6.

Figure 1:
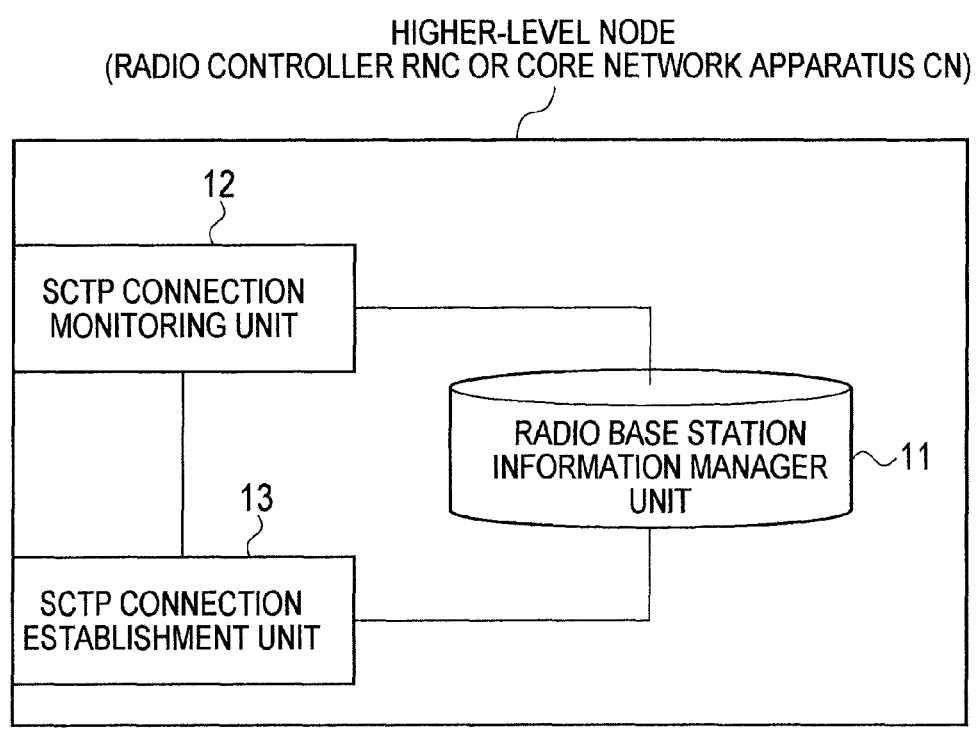
FIG. 1 is a functional block diagram of a higher-level node according to a first embodiment of the present invention.

As shown in FIG. 1, a higher-level node (radio controller RNC or core network apparatus CN) according to this embodiment includes a radio base station information manager unit 11, an SCTP connection monitoring unit 12 and an SCTP connection establishment unit 13.

The radio base station information manager unit 11 is configured to manage information relating to radio base stations under the higher-level node.

The radio base station information manager unit 11 is configured to manage whether each radio base station is a "home radio base station Home Node B" or a "macro radio base station Node B."

The SCTP connection monitoring unit 12 is configured to monitor a status of an SCTP connection with a macro radio base station Node B via an SCTP connection (first control signal connection).

Specifically, the SCTP connection monitoring unit 12 periodically transmits a "(SCTP) HEARTBEAT (first monitoring signal)" to a macro radio base station Node B via an SCTP connection (first control signal connection). The SCTP connection monitoring unit 12 then determines whether or not an SCTP connection is established with the macro radio base station Node B depending on whether or not a "(SCTP) HEARTBEAT ACK" for the "(SCTP) HEARTBEAT" is received.

Similarly, the SCTP connection monitoring unit 12 is configured to monitor a status of an SCTP connection with a home radio base station Home Node B via an SCTP connection (second control signal connection).

Specifically, the SCTP connection monitoring unit 12 periodically transmits a "(SCTP) HEARTBEAT (second monitoring signal)" to a home radio base station Home Node B via an SCTP connection (second control signal connection). The SCTP connection monitoring unit 12 then determines whether or not an SCTP connection is established with the home radio base station Home Node B depending on whether or not a "(SCTP) HEARTBEAT ACK" for the "(SCTP) HEARTBEAT" is received.

Here, the number of transmissions of "(SCTP) HEARTBEAT" to a macro radio base station Node B in a predetermined period may be configured to be greater than the number of transmissions of "(SCTP) HEARTBEAT" to a home radio base station Home Node B.

The status management for a home radio base station Home Node B is likely to be determined not to be performed as precisely as the status management for a macro radio base station Node B. Thus, the SCTP connection monitoring unit 12 may be configured accordingly.

Note that, the SCTP connection monitoring unit 12 is configured to be capable of determining with reference to the information relating to the radio base stations under the higher-level node whether each SCTP connection is established with a "macro radio base station Node B" or a "home radio base station Home Node B," the information managed by the radio base station information manager unit 11.

The SCTP connection establishment unit 13 is configured to transmit a "(SCTP) INIT (first control signal connection establishment request)" to a macro radio base station Node B, when detecting that no SCTP connection is established with the macro radio base station Node B.

The SCTP connection establishment unit 13, however, is configured not to transmit a "(SCTP) INIT (second control signal connection establishment request)" to a home radio base station Home Node B, when detecting that no SCTP connection is established with the home radio base station Home Node B.

Note that, the SCTP connection establishment unit 13 is configured to reply with a "(SCTP) INIT ACK" in response to the "(SCTP) INIT (second control signal connection establishment request)" transmitted from the home radio base station Home Node B, and then to establish an SCTP connection with the home radio base station Home Node B by transmitting a "(SCTP) COOKIE ACK" for a "(SCTP) COOKIE ECHO" transmitted from the home radio base station Home Node B.

Figure 2:
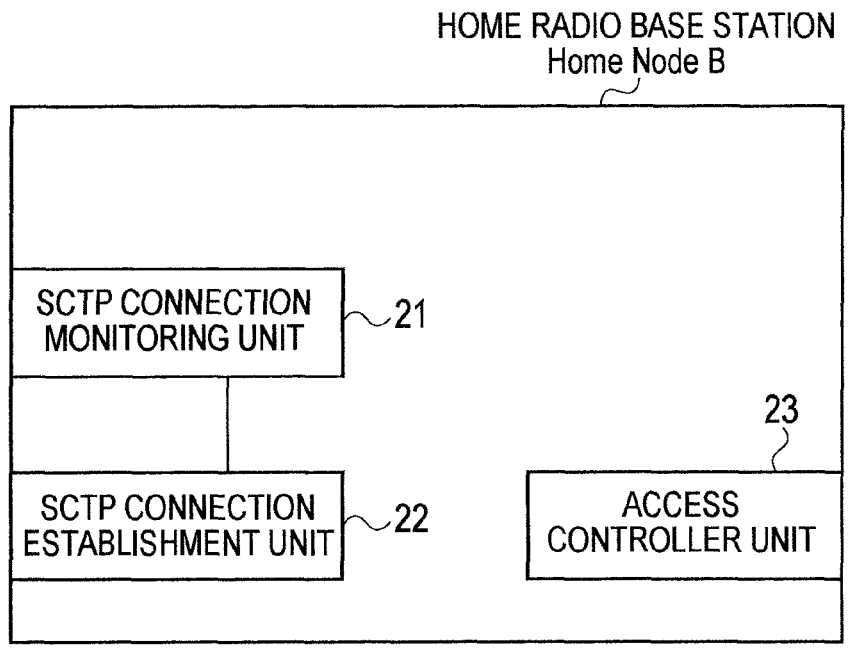
FIG. 2 is a functional block diagram of a home radio base station Home Node B according to the first embodiment of the present invention.

As shown in FIG. 2, a home radio base station Home Node B according to this embodiment includes an SCTP connection monitoring unit 21, an SCTP connection establishment unit 22 and an access controller unit 23.

The SCTP connection monitoring unit 21 is configured to monitor a status of an SCTP connection with a higher-level node (radio controller RNC or core network apparatus CN) via an SCTP connection (second control signal connection).

Specifically, the SCTP connection monitoring unit 21 periodically transmits a "(SCTP) HEARTBEAT" to a higher-level node via an SCTP connection (second control signal connection). The SCTP connection monitoring unit 21 then determines whether or not an SCTP connection is established with the higher-level node depending on whether or not a "(SCTP) HEARTBEAT ACK" for the "(SCTP) HEARTBEAT" is received.

The SCTP connection establishment unit 22 is configured to transmit a "(SCTP) INIT (second control signal connection establishment request)" to a higher-level node, when detecting that no SCTP connection is established with the higher-level node.

The access controller unit 23 is configured to manage mobile stations UE each capable of accessing the home radio base station Home Node B, that is, capable of performing radio communications via the home radio base station Home Node B.

Further, the access controller unit 23 is configured to provide radio communication service only to the mobile communication stations UE capable of accessing the home radio base station Home Node B.

Figure 3:
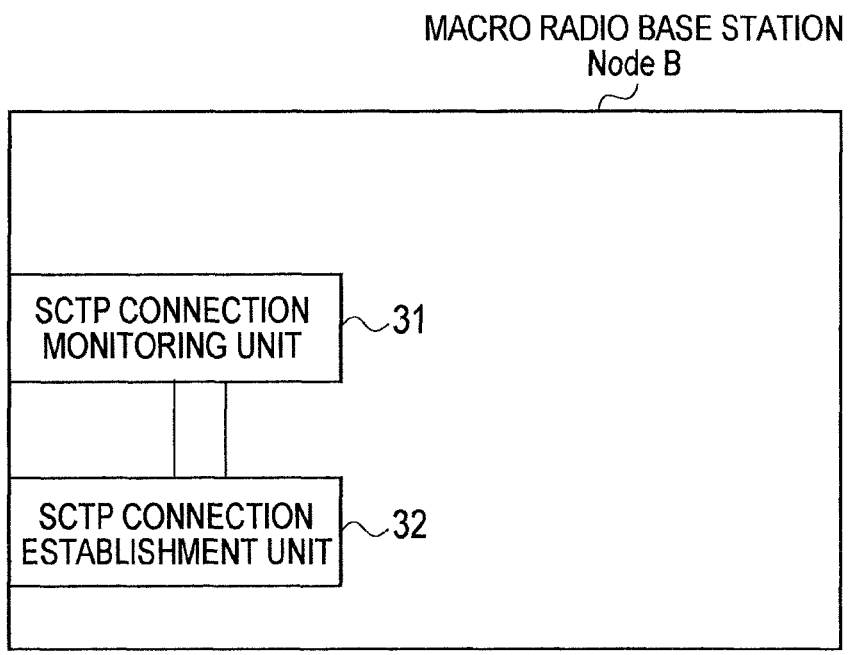
FIG. 3 is a functional block diagram of a macro radio base station Node B according to the first embodiment of the present invention.

As shown in FIG. 3, a macro radio base station Node B according to this embodiment includes an SCTP connection monitoring unit 31 and an SCTP connection establishment unit 32.

The SCTP connection monitoring unit 31 is configured to monitor a status of an SCTP connection with a higher-level node (radio controller RNC, home radio base station Home Node B aggregator, core network apparatus CN, or the like) via an SCTP connection (first control signal connection).

Specifically, the SCTP connection monitoring unit 31 periodically transmits a "(SCTP) HEARTBEAT" to a higher-level node via an SCTP connection (first control signal connection). The SCTP connection monitoring unit 31 then determines whether or not an SCTP connection is established with the higher-level node depending on whether or not a "(SCTP) HEARTBEAT ACK" for the "(SCTP) HEARTBEAT" is received.

The SCTP connection establishment unit 32 is configured to establish an SCTP connection with a higher-level node by replying with a "(SCTP) INIT ACK" in response to a "(SCTP) INIT (first control signal connection establishment request)" transmitted from the higher-level node, without transmitting a "(SCTP) INIT (first control signal connection establishment request)" to the higher-level node, even when detecting that no SCTP connection is established with the higher-level node.

(Operation of Mobile Communication System According to First Embodiment of Present Invention)

An operation of the mobile communication system according to the first embodiment of the present invention will be described with reference to FIG. 4.

Figure 4:
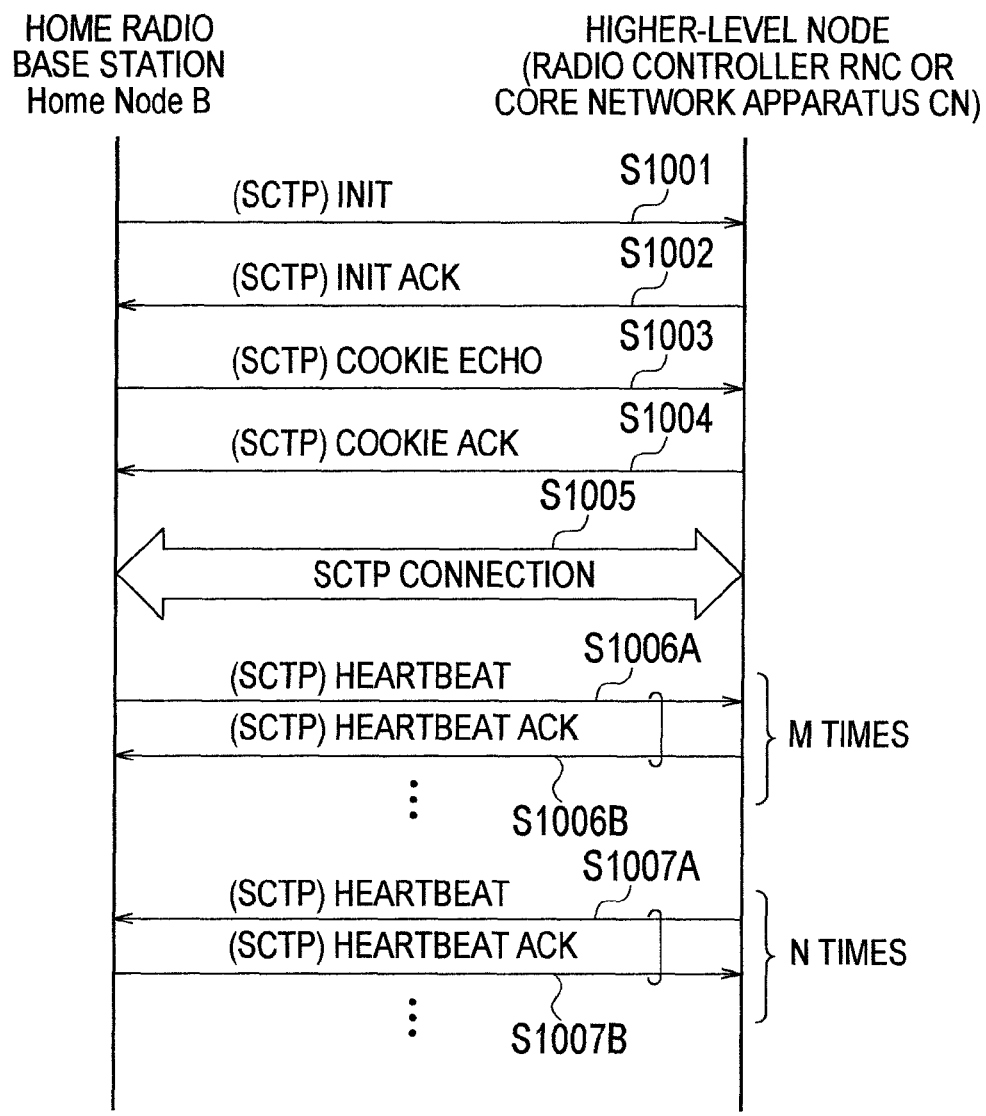
FIG. 4 is a sequence diagram showing an operation of a mobile communication system according to the first embodiment of the present invention.

As shown in FIG. 4, in step S1001, when detecting by a "(SCTP) HEARTBEAT" that no SCTP connection is established with a higher-level node, the home radio base station Home Node B transmits a "(SCTP) INIT" to the higher-level node.

Here, even when detecting that no SCTP connection is established with the home radio base station Home Node B, the higher-level node does not transmit a "(SCTP) INIT" to the home radio base station Home Node B.

In step S1002, when the higher-level node having received the "(SCTP) INIT" determines that an SCTP connection can be established, the higher-level node replies to the home radio base station Home Node B with a "(SCTP) INIT ACK."

In step S1003, the home radio base station Home Node B transmits a "(SCTP) COOKIE ECHO" for performing authentication processing to the higher-level node.

In step S1004, the higher-level node transmits a "(SCTP) COOKIE ACK" to the home radio base station Home Node B.

In step S1005, an SCTP connection is established between the higher-level node and the home radio base station Home Node B.

In step S1006A, the home radio base station Home Node B transmits a "(SCTP) HEARTBEAT" for monitoring processing to the higher-level node. In step S1006B, the higher-level node replies to the home radio base station Home Node B with a "(SCTP) HEARTBEAT ACK".

On the other hand, in step S1007A, the higher-level node transmits a "(SCTP) HEARTBEAT" for monitoring processing to the home radio base station Home Node B. In step S1007B, the home radio base station Home Node B replies to the higher-level node with a "(SCTP) HEARTBEAT ACK."

(Effects and Advantages of Mobile Communication System according to First Embodiment of the Present Invention)

With the mobile communication system according to the first embodiment, a higher-level node (radio controller RNC or core network apparatus CN) is configured not to transmit a "(SCTP) INIT" to a home radio base station Home Node B. Thus, an SCTP connection can be efficiently established while an unnecessary increase in the processing load of the higher-level node is avoided.

Note that operation of the above described mobile station UE, the radio base station NodeB/Home NodeB, the radio network controller RNC and the core network apparatus CN may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station NodeB/Home NodeB, the radio network controller RNC and the core network apparatus CN. Also, the storage medium and the processor may be provided in the mobile station UE, the radio base station NodeB/Home NodeB, the radio network controller RNC and the core network apparatus CN as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, the present invention can provide a mobile communication method and a mobile communication system, which are capable of efficiently establishing an SCTP connection while avoiding an unnecessary increase in the processing load of a higher-level node by switching SCTP connection establishment methods between a home radio base station Home Node B and a macro radio base station Node B.

The invention claimed is:

1. A mobile communication method for establishing a control signal connection between a higher-level node and a radio base station, the method comprising the steps of:

transmitting, from the higher-level node to a macro radio base station, a first control signal connection establishment request, when the higher-level node detects that no control signal connection is established with the macro radio base station;

establishing a first control signal connection between the higher-level node and the macro radio base station in response to the transmitted first control signal connection establishment request;

transmitting, from a home radio base station to a higher-level node, a second control signal connection establishment request, when the home radio base station detects that no control signal connection is established with the higher-level node; and establishing a second control signal connection between the higher-level node and the home radio base station in response to the transmitted second control signal connection establishment request; wherein the higher-level node does not transmit the second control signal connection establishment request to the home radio base station, even when detecting that no control signal connection is established with the home radio base station.

2. The mobile communication method according to claim 1, further comprising the steps of:

transmitting, from the higher-level node to the macro radio base station, a first monitoring signal for monitoring the macro radio base station, via the first control signal connection; and transmitting, from the higher-level node to the home radio base station, a second monitoring signal for monitoring the home radio base station, via the second control signal connection; wherein the number of transmissions of the first monitoring signal is greater than the number of transmissions of the second monitoring signal in a predetermined period.

3. A mobile communication system configured to establish a control signal connection between a higher-level node and a radio base station, wherein the higher-level node is configured to transmit a first control signal connection establishment request to a macro radio base station, when detecting that no control signal connection is established with the macro radio base station;

a first control signal connection is configured to be established between the higher-level node and the macro radio base station in response to the transmitted first control signal connection establishment request;

a home radio base station is configured to transmit a second control signal connection establishment request to the higher-level node, when detecting that no control signal connection is established with the higher-level node;

a second control signal connection is configured to be established between the higher-level node and the home radio base station in response to the transmitted second control signal connection establishment request; and the higher-level node does is configured not to transmit the second control signal connection establishment request to the home radio base station, even when detecting that no control signal connection is established with the home radio base station.

4. The mobile communication system according to claim 3, wherein the higher-level node is configured to transmit a first monitoring signal for monitoring the macro radio base station to the macro radio base station via the first control signal connection;

the higher-level node is configured to transmit a second monitoring signal for monitoring the home radio base station to the home radio base station via the second control signal connection; and the number of transmissions of the first monitoring signal is configured to be greater than the number of transmissions of the second monitoring signal in a predetermined period.

* * * * *